(12) United States Patent
Lin et al.

(10) Patent No.: US 8,416,560 B2
(45) Date of Patent: Apr. 9, 2013

(54) AUXILIARY MECHANISM

(75) Inventors: Kuo-Kun Lin, New Taipei (TW);
Chu-Chia Tsai, New Taipei (TW);
Chia-Hsien Lee, New Taipei (TW);
Wen-Chin Wu, New Taipei (TW)

(73) Assignee: Wistron Corp., New Taipei (TW)

( * ) Notice: Subject to any disclaimer, the term of this patent is extended or adjusted under 35 U.S.C. 154(b) by 115 days.

(21) Appl. No.: 13/117,091

(22) Filed: May 26, 2011

(65) Prior Publication Data

US 2011/0228488 A1 Sep. 22, 2011

Related U.S. Application Data (63) Continuation of application No. 11/942,451, filed on Nov. 19, 2007, now Pat. No. 8,081,436.

(30) Foreign Application Priority Data

Nov. 29, 2006 (TW) .............................. 95221044 U
Jan. 20, 2007 (TW) .............................. 96201589 U
Jul. 30, 2007 (TW) .............................. 96212438 U (51) Int. Cl.
*H05K 5/00* (2006.01)
*H05K 7/00* (2006.01)

(52) U.S. Cl. .......... 361/679.23; 361/679.24; 361/679.25
(58) Field of Classification Search ............ 361/679.26, 361/679.25, 679.55; 248/229.1, 229.2, 549, 248/442.2, 447.1; 348/207.99, 207.1
See application file for complete search history.

(56) References Cited

U.S. PATENT DOCUMENTS

| | | | | |
|---|---|---|---|---|
| 5,697,594 A | * | 12/1997 | Adams et al. | 248/442.2 |
| 7,461,253 B2 | * | 12/2008 | Braskich et al. | 713/169 |
| 7,542,270 B2 | * | 6/2009 | Chen | 361/679.25 |
| 2005/0141182 A1 | * | 6/2005 | Ma et al. | 361/683 |
| 2006/0152894 A1 | * | 7/2006 | Moengen | 361/681 |

* cited by examiner

*Primary Examiner* — Anthony Haughton (57) ABSTRACT

An auxiliary mechanism to be attached to a portable electronic device when capturing image data of an image medium, the portable electronic device includes an image capture element, the auxiliary mechanism comprises a body, a fixer and a connecting element. The fixer is connected to the body, wherein the image medium is placed on the fixer. The connecting element is connected to the body and detachably connected to the portable electronic device, wherein the image capture element corresponds to the image medium and captures the image data thereof.

12 Claims, 14 Drawing Sheets

AUXILIARY MECHANISM

This application is a continuation of U.S. application Ser. No. 11/942,451, filed Nov. 19, 2007, the entire disclosure of which is hereby incorporated by reference.

BACKGROUND OF THE INVENTION

1. Field of the Invention

The invention relates to an auxiliary mechanism, and more particularly to an auxiliary mechanism utilized in copying image media.

2. Description of the Related Art

Figure 1:
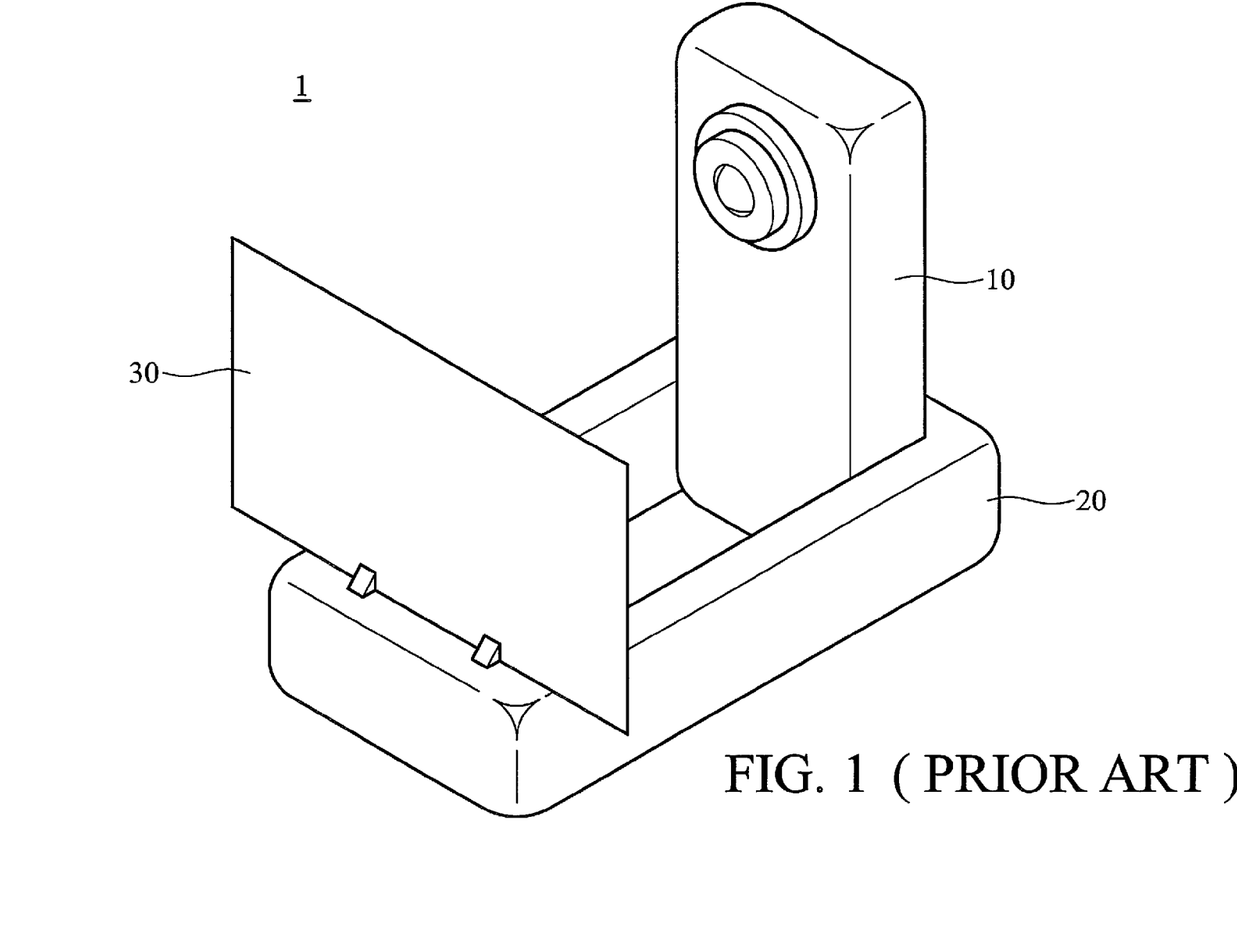
FIG. 1 shows a conventional image capture device.

FIG. 1 shows a conventional image capture device 1 comprising an image capture element 10 and a holder 20. The image capture element 10 is connected to the holder 20. An image medium 30 (for example, business card) is fixed on the holder 20, and the image capture element 10 captures image data thereof.

In a conventional image capture device, the image data captured from the image medium 30 is stored in the image capture element 10, or transmitted to a notebook or other portable electronic device via a transmission line. Conventional image capture device 1 is large and inconvenient to transport. Additionally, the cost of conventional image capture device 1 increases with data storage and transmission functions.

BRIEF SUMMARY OF THE INVENTION

A detailed description is given in the following embodiment of the inventions with reference to the accompanying drawings.

The invention relates to an auxiliary mechanism attached to a portable electronic device during capture of the image data of an image medium. The portable electronic device comprises an image capture element. The auxiliary mechanism comprises a body, a fixer and a connecting element. The fixer is connected to the body, wherein the image medium is placed on the fixer. The connecting element is connected to the body and detachably connected to the portable electronic device, wherein the image capture element corresponds to the image medium and image is captured data therefrom.

The invention also relates to a portable electronic device comprising a host, a cover, an image capture element and an auxiliary mechanism. The host comprises a receiving portion. The cover pivots on the host. The image capture element is disposed on the cover. The auxiliary mechanism comprises a body, a fixer and a connecting element. The fixer is connected to the body, wherein an image medium is fixed on the fixer. The connecting element is connected to the body and detachably connected to the cover, wherein the connecting element is connected to the cover and the image capture element captures image data of the image medium in a first state, and the auxiliary mechanism is received in the receiving portion in a second state.

The invention requires no external image capture device. The image capture process (for example, a business card copying process) is thus simplified, and easily performed. Additionally, the image capture element of the invention is directly incorporated on the portable electronic device (a notebook computer), and the cost of image capture is thus reduced.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
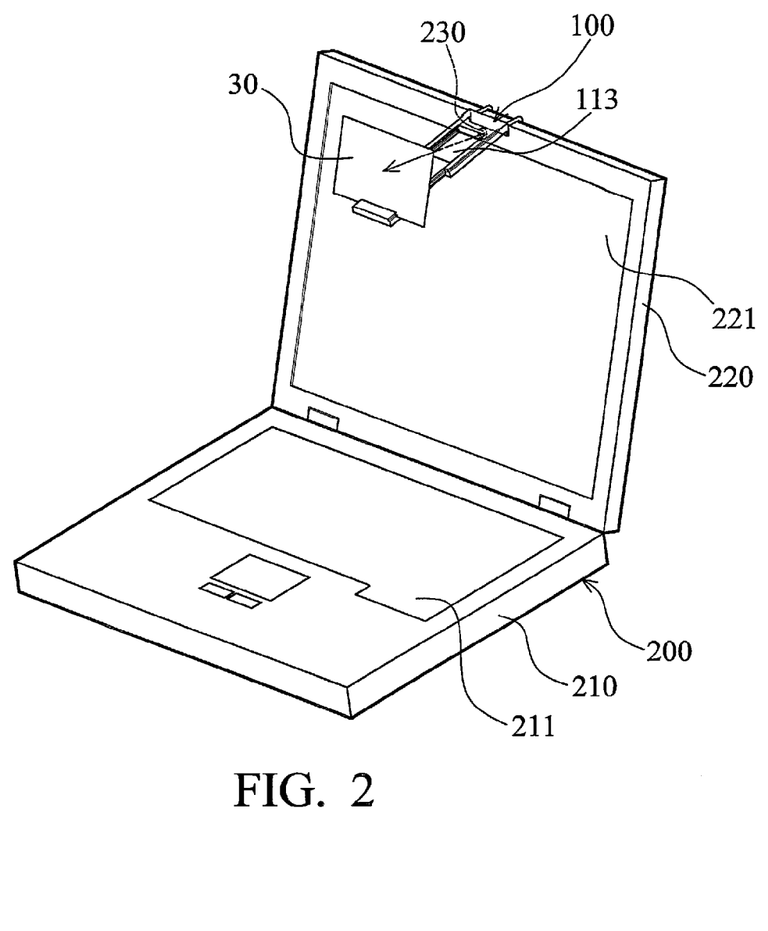
FIG. 2 shows an auxiliary mechanism of a first embodiment of the invention.

FIG. 2 shows an auxiliary mechanism 100 of a first embodiment of the invention, attached to a portable electronic device (a notebook computer) 200. The portable electronic device comprises a host 210, a cover 220 and an image capture element 230. The host 210 comprises an input interface 211. The cover 220 comprises a display 221. The image capture element 230 is disposed on the cover 220. An image medium 30 is fixed on the auxiliary mechanism 100. When the image capture element 230 captures an image data of the image medium 30 (first state), the image capture element 230 corresponds to the image medium 30.

Figure 3A:
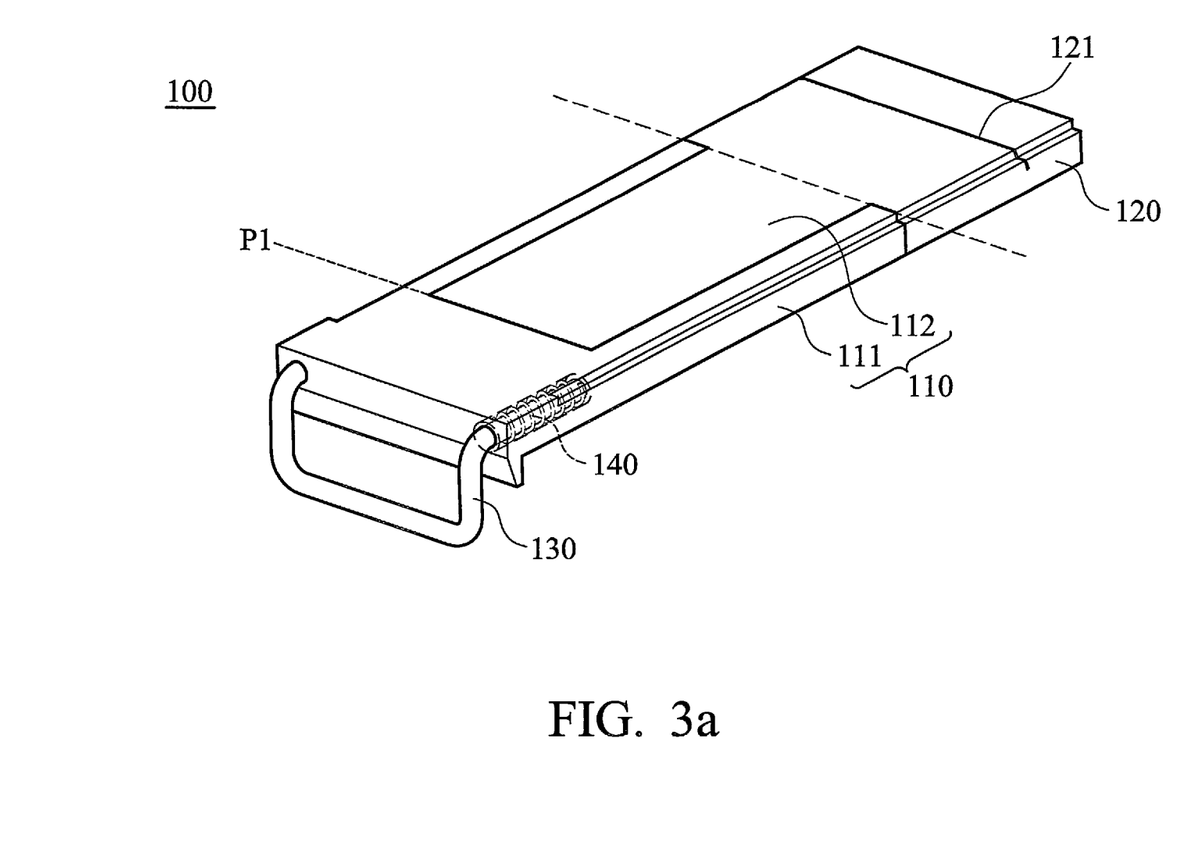
FIG. 3a shows a second section in a first position in the first embodiment of the invention.
Figure 3B:
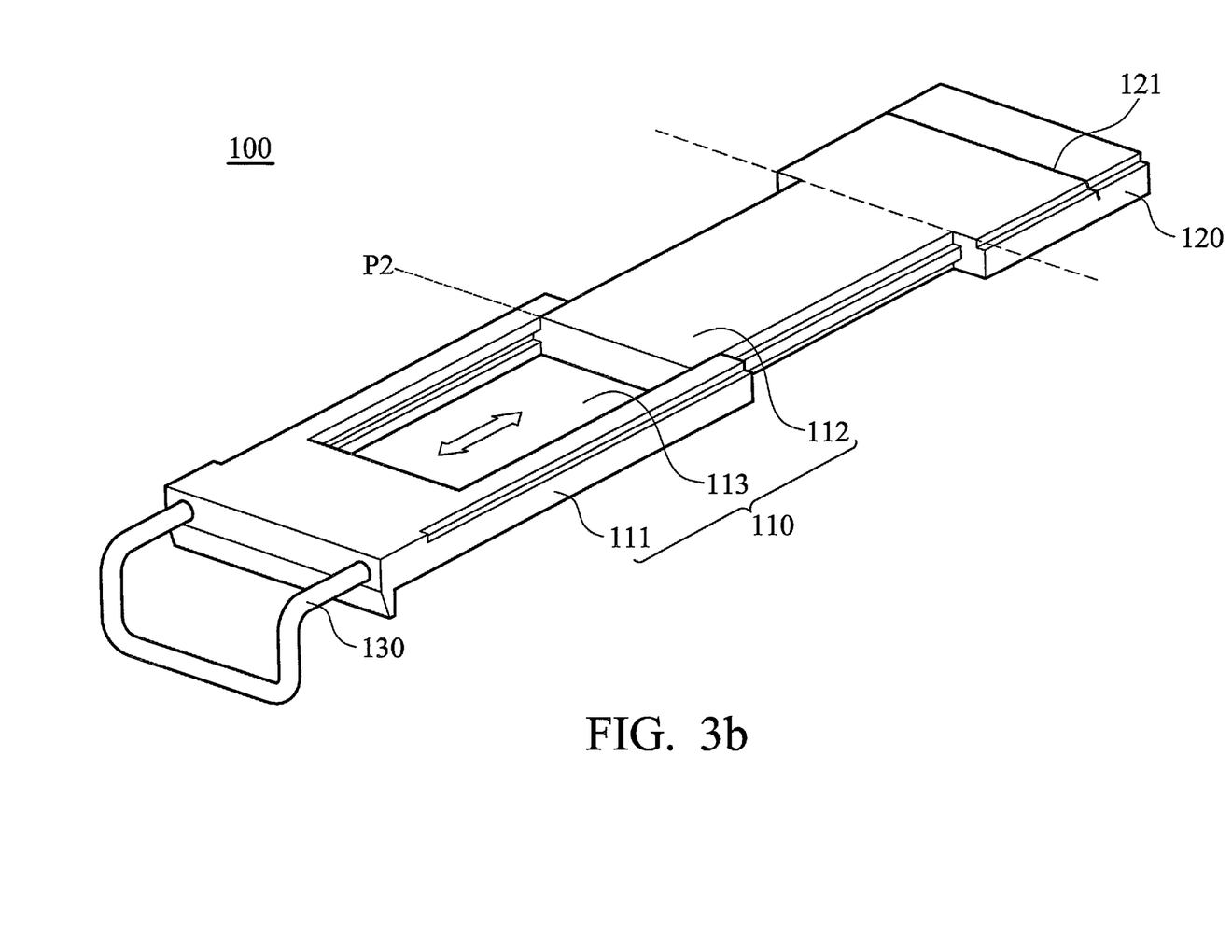
FIG. 3b shows a second section in a second position in the first embodiment of the invention.

With reference to FIGS. 3a and 3b, the auxiliary mechanism 100 comprises a body 110, a fixer 120 and a connecting element (hook) 130. The fixer 120 is connected to the body 110 comprising a slot 121. The image medium 30 is inserted in the slot 121. The connecting element 130 is connected to the body 110, and detachably attached to the cover 220 (with reference to FIG. 2). The body 110 and the fixer 120 are flat structures. The body 110 comprises a first section 111 and a second section 112. The first section 111 comprises an opening 113. The fixer 120 is disposed on an end of the second section 112. The second section 112 slides between a first position P1 and a second position P2. When the second section 112 is in the first position P1, the second section 112 is in the opening 113. When the second section 112 is in the second position P2, the second section 112 is not in the opening 113.

When the image capture element 230 captures the image data, the second section 112 is in the second position P2 out of the opening 113, and the image capture element 230 captures the image data of the image medium 30 through the opening 113 (with reference to FIG. 2). When the auxiliary mechanism 100 is packaged or transported, the second section 112 is in the first position P1 to reduce the volume thereof.

With reference to FIG. 3a, the auxiliary mechanism 100 further comprises an elastic element 140 disposed between the connecting element 130 and the body 110. The elastic element 140 provides an elastic force to the connecting element 130, and the auxiliary mechanism 100 clamps to the cover 200 by the elastic force.

Figure 4:
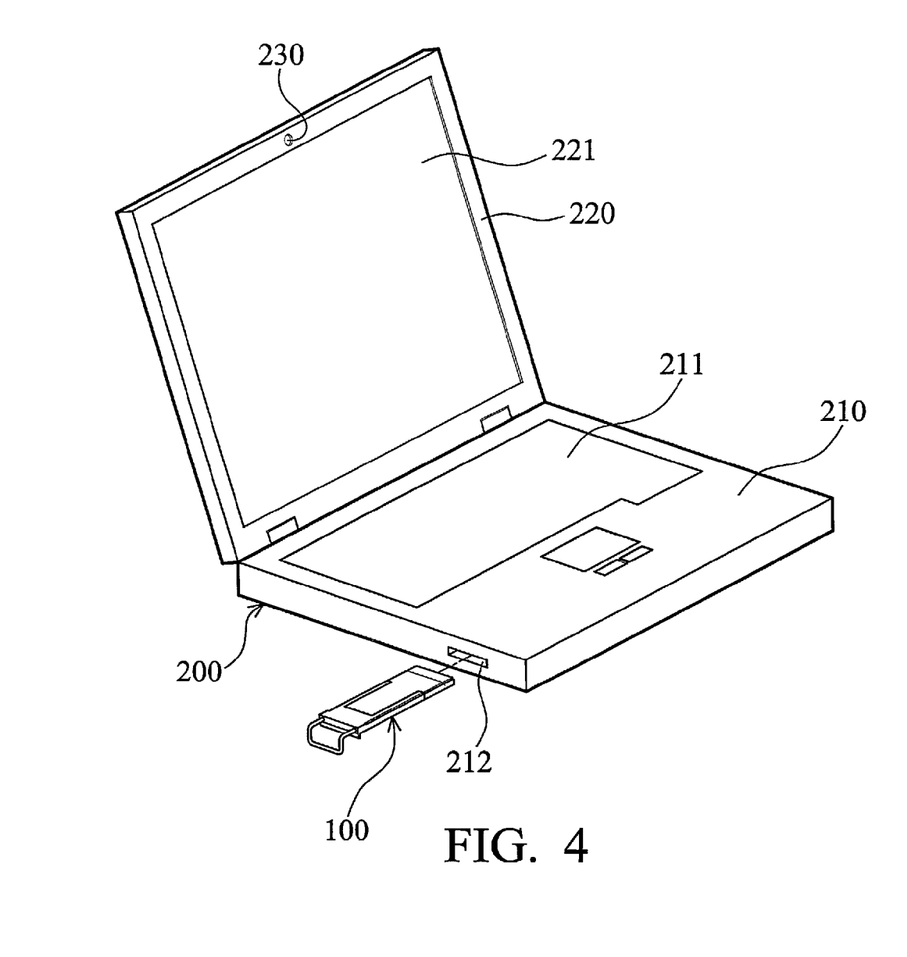
FIG. 4 shows the auxiliary mechanism received in a receiving portion in the first embodiment of the invention.

FIG. 4 shows the auxiliary mechanism 100 received in the portable electronic device 200 (second state). The portable electronic device 200 comprises a receiving portion 212 disposed on the host 210. The receiving portion 212 is a PCM-CIA card socket or an express card socket. When the auxiliary mechanism 100 is packaged and transported, the auxiliary mechanism 100 is received in the receiving portion 212.

The invention requires no external image capture device. The image capture process (for example, a business card copying process) is thus simplified, and easily performed. Additionally, the image capture element of the invention is directly joined to the portable electronic device (a notebook computer), and cost of image capture is therefore reduced.

Figure 5A:
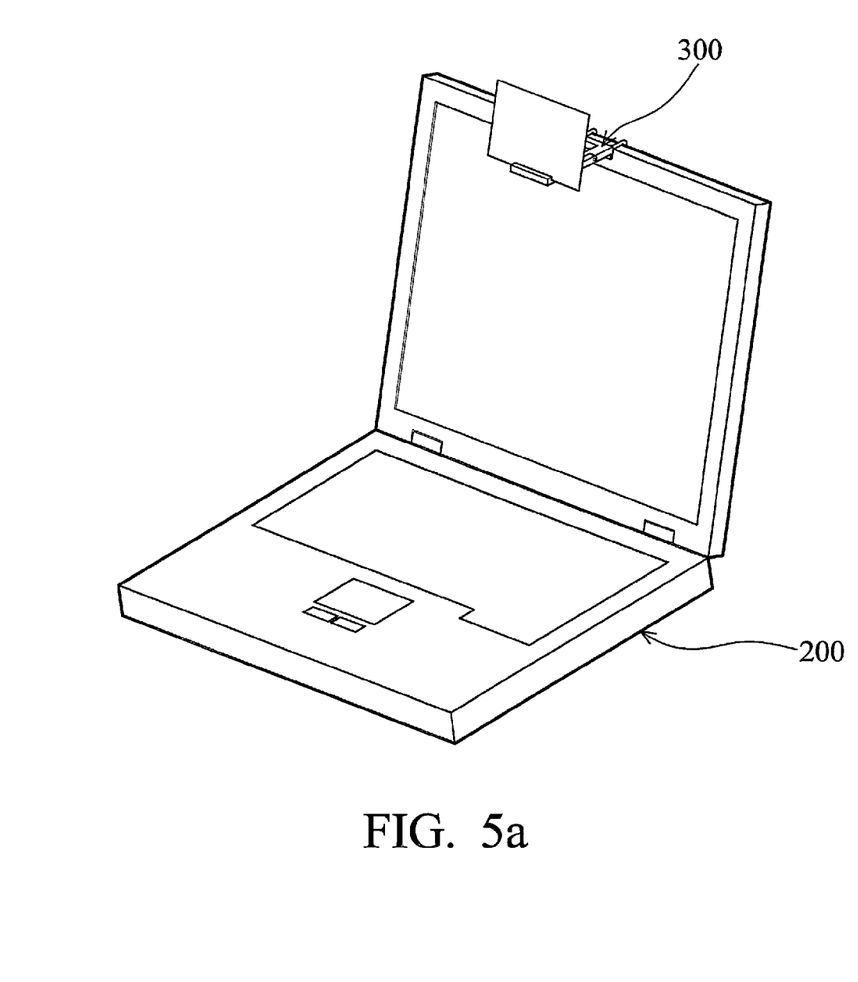
FIG. 5a shows an auxiliary mechanism of a second embodiment of the invention.

FIG. 5a shows an auxiliary mechanism 300 of a second embodiment of the invention, which is disposed on the portable electronic device (a notebook computer) 200. The image capture element 230 corresponds to the image medium 30 and captures image data thereof.

Figure 5B:
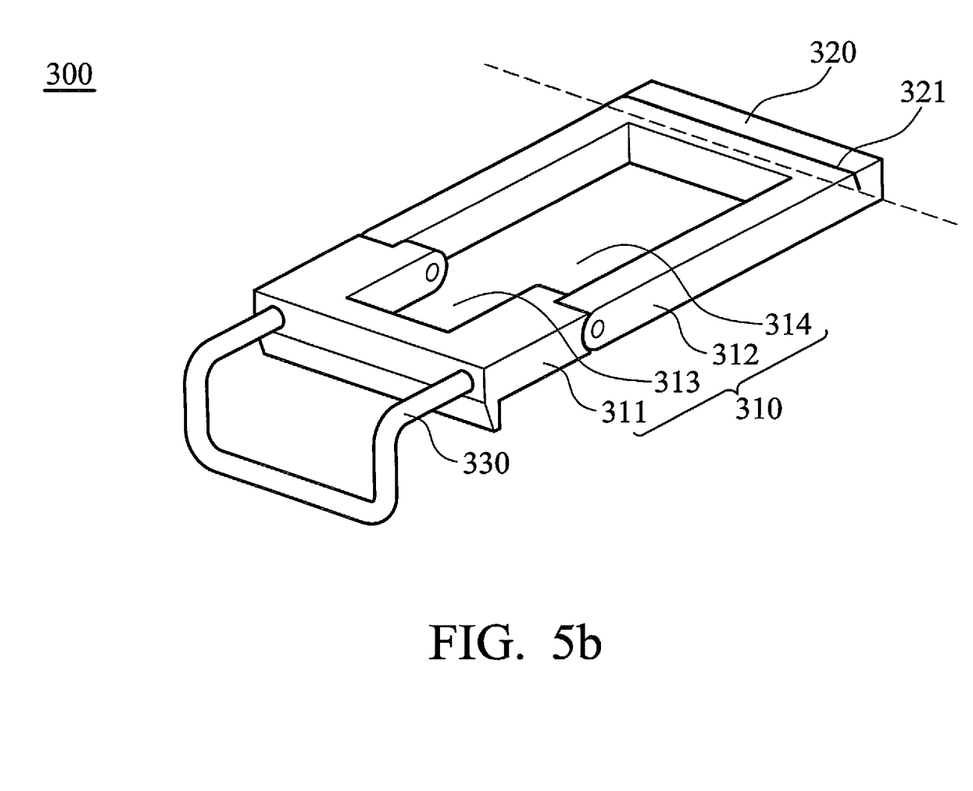
FIG. 5b shows a detailed structure of the auxiliary mechanism of the second embodiment of the invention.

With reference to FIG. 5b, the auxiliary mechanism 300 comprises a body 310, a fixer 320 and a connecting element (hook) 330. The fixer 320 is connected to the body 310. The body 310 comprises a slot 321. The image medium 30 is inserted in the slot 321. The connecting element 330 is connected to the body 310, and detachably attached to the cover 220 (with reference to FIG. 5a). The body 310 and the fixer 320 are sheets. The body 310 comprises a first section 311 and a second section 312. The first section 311 comprises a first opening 313. The second section 312 comprises a second opening 314. The fixer 320 is disposed on an end of the second section 312. The second section 312 pivots on the first section 311.

The image capture element 230 captures the image data of the image medium 30 through the first opening 313 and the second opening 314.

Figure 5C:
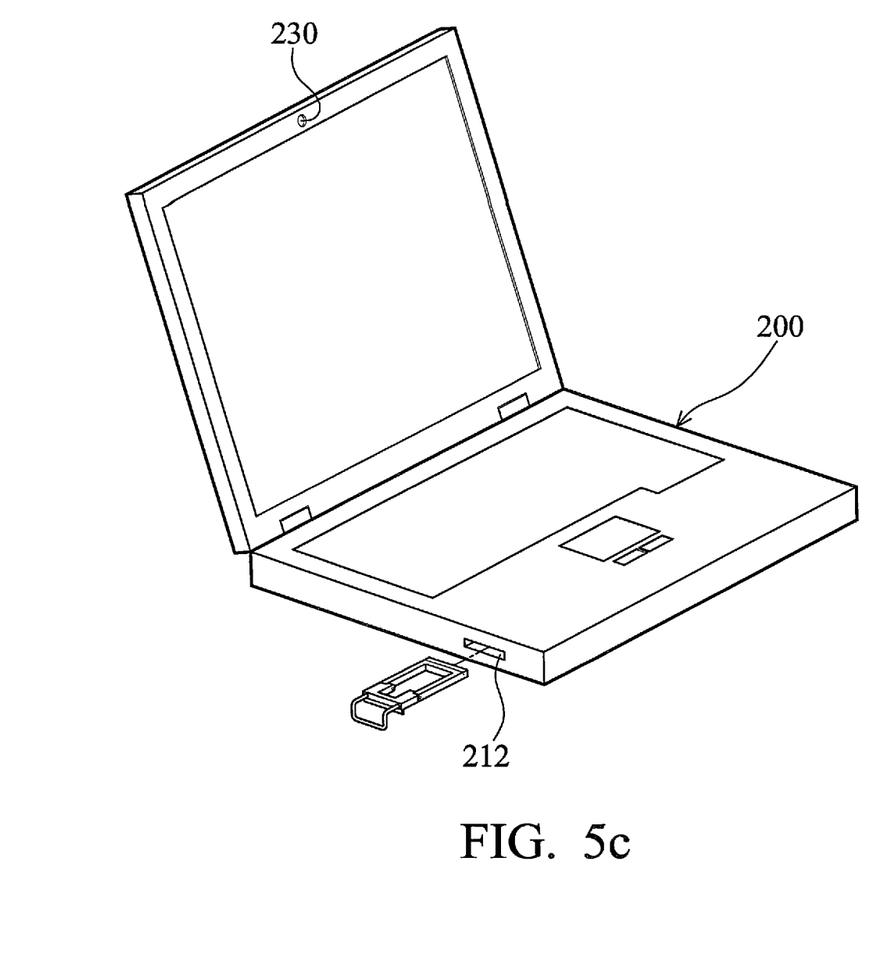
FIG. 5c shows the auxiliary mechanism received in a receiving portion in the second embodiment of the invention.

With reference to FIG. 5c, the auxiliary mechanism 300 can also be received in the receiving portion 212 of the portable electronic device 200.

Figure 6A:
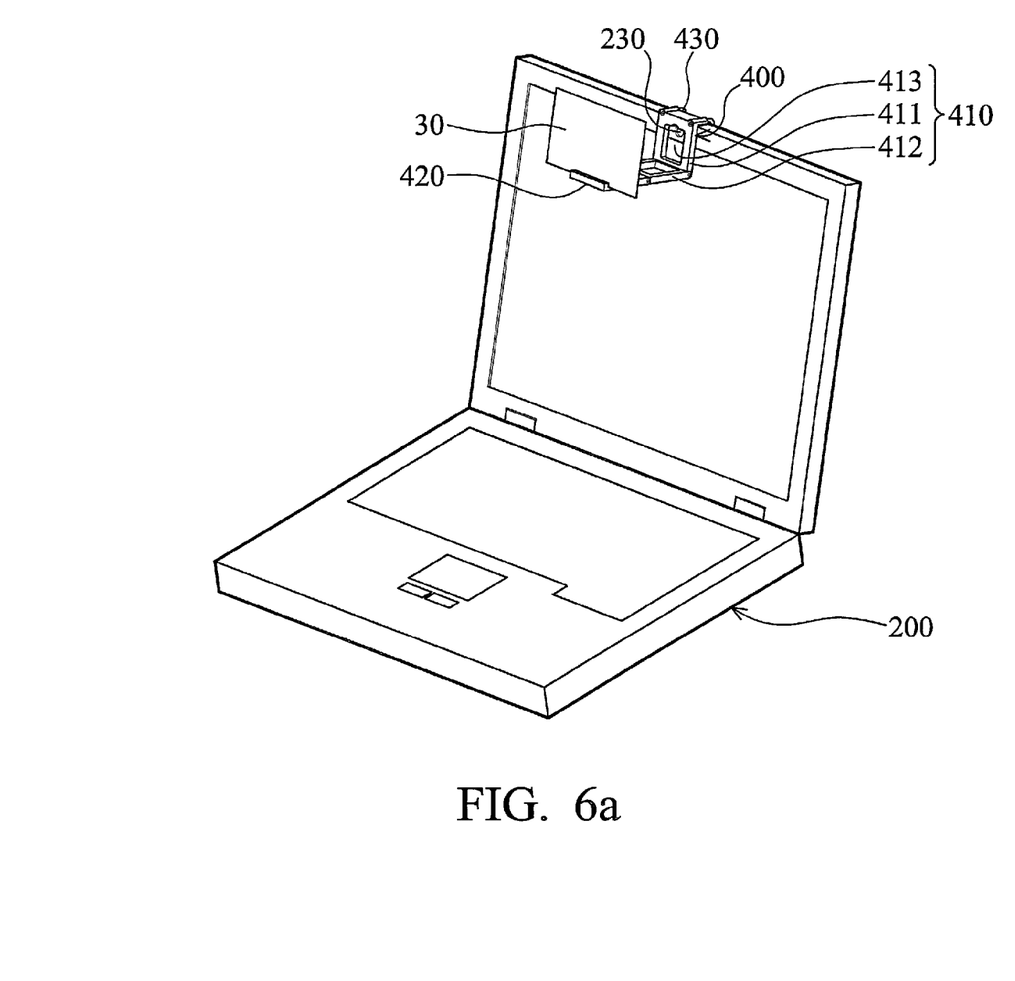
FIG. 6a shows an auxiliary mechanism of a third embodiment of the invention.

FIG. 6a shows an auxiliary mechanism 400 of a third embodiment of the invention. The auxiliary mechanism 400 comprises a body 410, a fixer 420 and a connecting element (hook) 430. The fixer 420 is connected to the body 410. The image medium 30 is fixed on the fixer 420. The connecting element 430 is connected to the body 410, and detachably attached to the cover 220. The body 410 and the fixer 420 are sheets. The body 410 comprises a first section 411 and a second section 412. The first section 411 comprises an opening 413. The fixer 420 is disposed on an end of the second section 412. The second section 412 pivots on the first section 411.

When image capture element 230 captures the image data of the image medium 30 through the opening 413, the first section 411 is perpendicular to the second section 412.

Figure 6B:
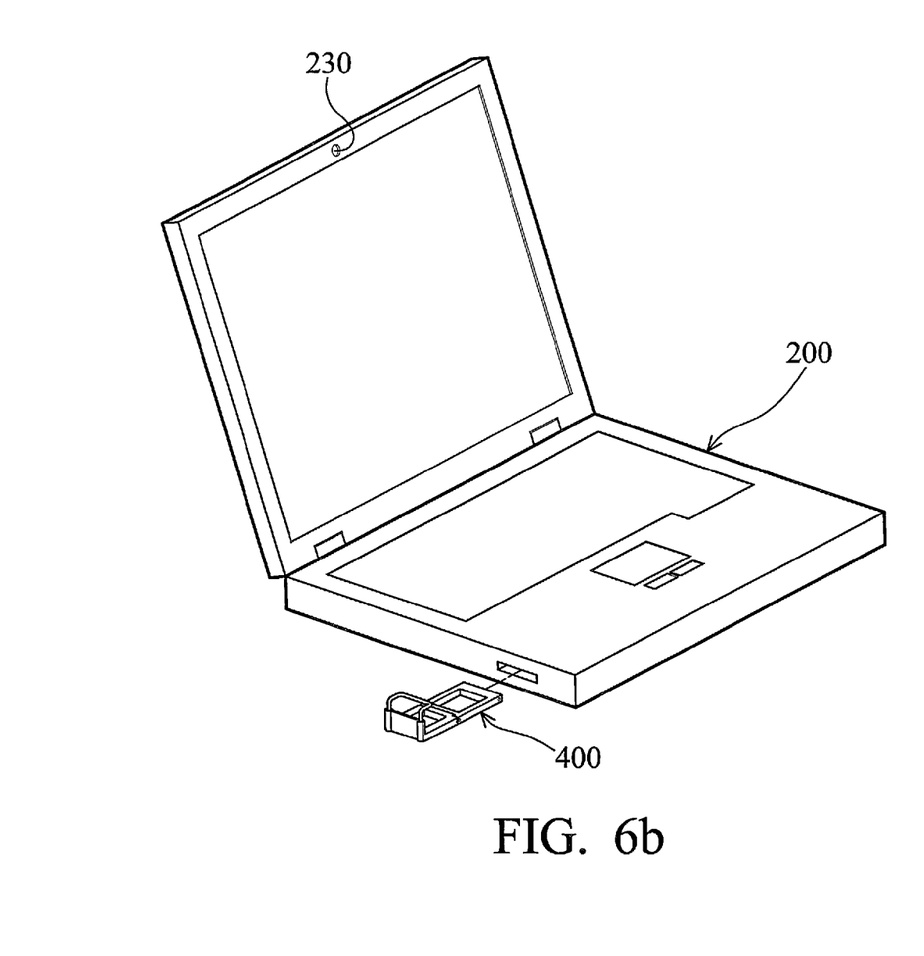
FIG. 6b shows the auxiliary mechanism received in a receiving portion in the third embodiment of the invention.

With reference to FIG. 6b, the auxiliary mechanism 400 can also be received in the receiving portion 212 of the portable electronic device 200.

In the second and third embodiments of the invention, the auxiliary mechanism can further comprise an elastic element providing an elastic force to the connecting element, and the auxiliary mechanism clamps the cover by the elastic force.

Figure 7A:
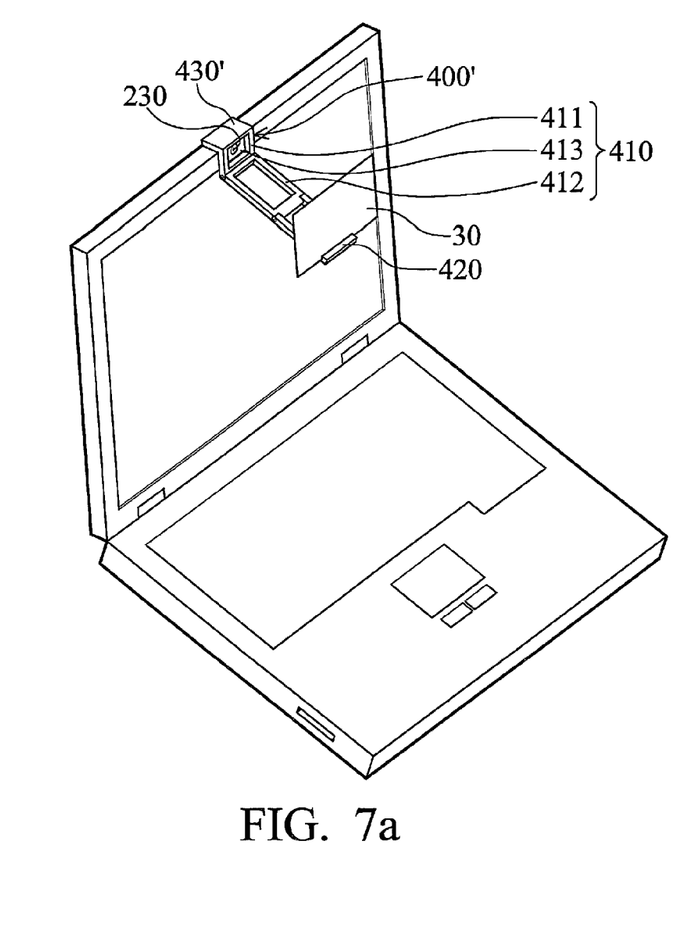
FIG. 7a shows an auxiliary mechanism of a fourth embodiment of the invention.

FIG. 7a shows an auxiliary mechanism 400' of a fourth embodiment of the invention, wherein a connecting element 430' thereof is a magnetic element, and the connecting element 430' connects the portable electronic device 200 by a magnetic force. The housing of the portable electronic device 200 is comprised of a material with magnetic potential, for example, metal.

Figure 7B:
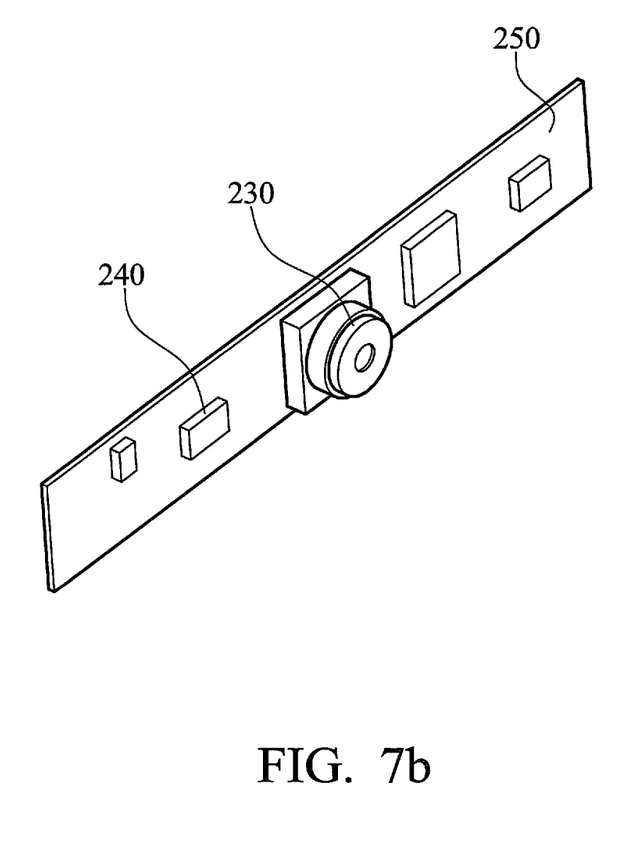
FIG. 7b shows a modified fourth embodiment of the invention.

FIG. 7b shows a modified example of the fourth embodiment of the invention, wherein the portable electronic device 200 further comprises a circuit board 250 and a magnetoresistive sensor 240. The magnetoresistive sensor 240 and the image capture element 230 are disposed on the circuit board 250. When the connecting element 430' is connected to the portable electronic device 200 by magnetic force, the magnetoresistive sensor 240 is actuated by the magnetic force to send a magnetoresistive signal, and the image capture element 230 is switched to a copy mode (close-up mode) according to the magnetoresistive signal. With reference to FIG. 7a, in the copy mode, the viewing angle and the focal length of the image capture element 230 are modified automatically corresponding to the image medium 30.

Figure 8A:
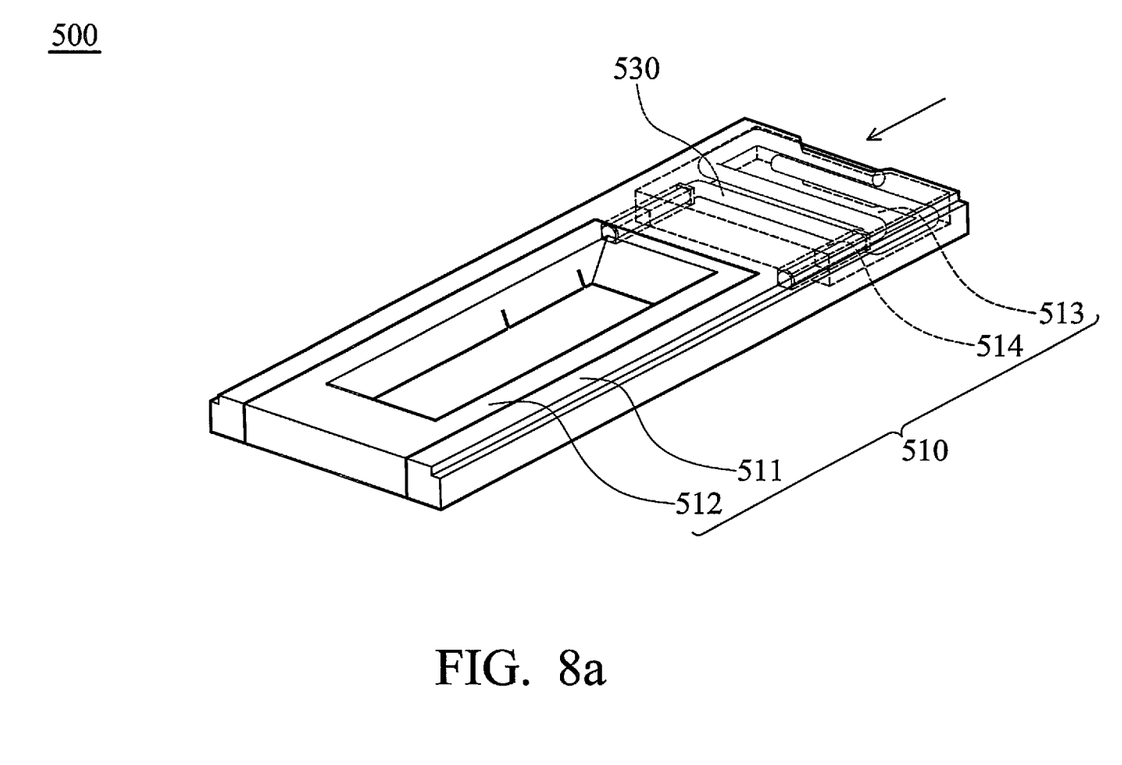
FIGS. 8a and 8b show a fifth embodiment of the invention.
Figure 8B:
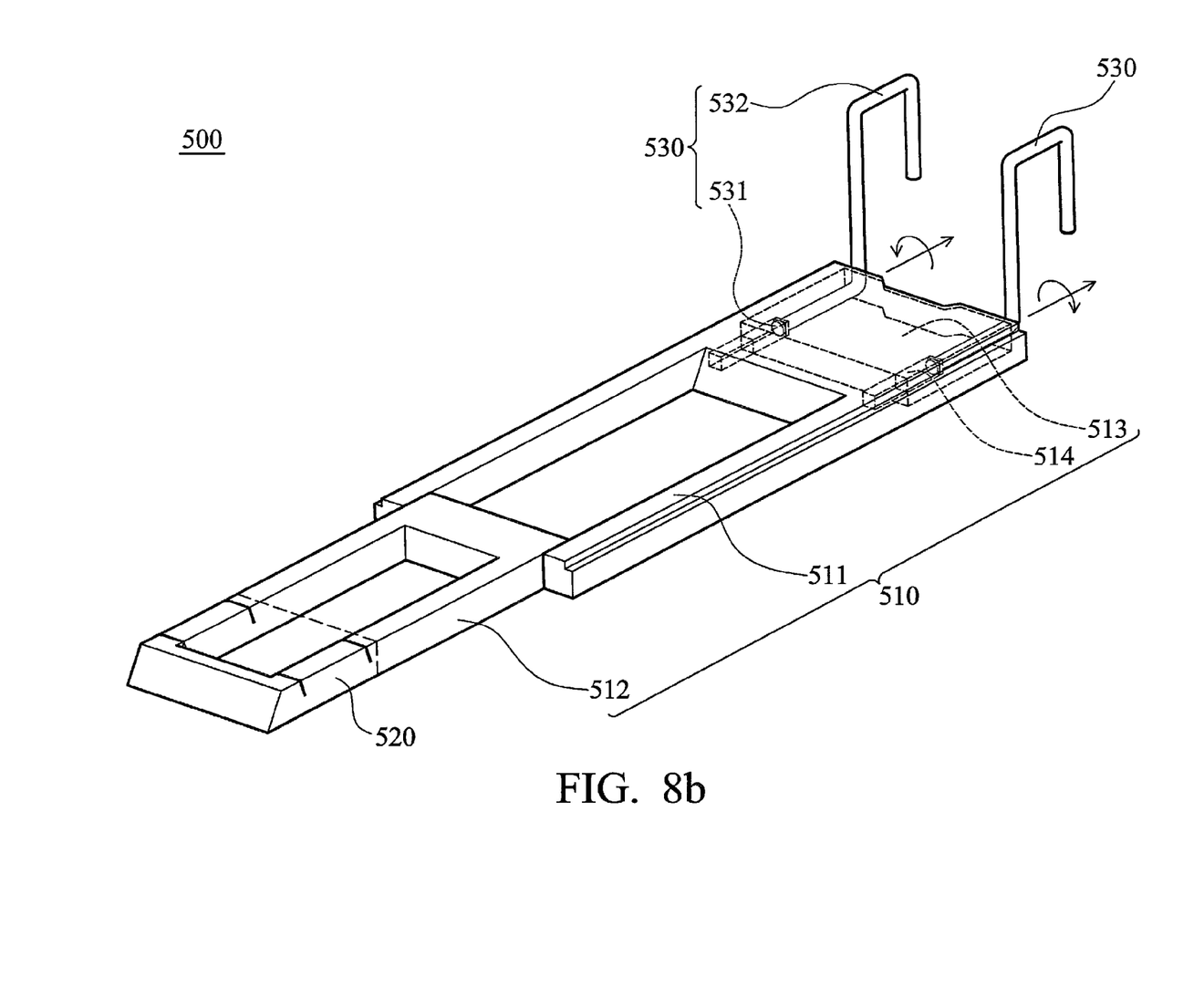

FIGS. 8a and 8b show a modified example of the fifth embodiment of the invention. The auxiliary mechanism 500 comprises a body 510, a fixer 520 and connecting elements (hook) 530. The body 510 comprises a first section 511 and a second section 512. The fixer 520 is disposed on the second section 512. The second section 512 pivots on the first section 511. In the fifth embodiment, the connecting elements 530 can be received in the body 510. With reference to FIG. 8b, each connecting element 530 comprises an U-shaped section 532 and a connection section 531. The body 510 further comprises a receiving recess 513 and a guiding groove 514. With reference to FIG. 8a, when the auxiliary mechanism 500 is not in use, the U-shaped sections 532 of the connecting element 530 are received in the receiving recess 513. With reference to FIG. 8b, the connection section 531 slides in the guiding groove 514. When the auxiliary mechanism 500 is in use, the connecting elements 530 slide out of the receiving recess 513, rotate in the arrow direction, and hang on the portable electronic device via the U-shaped sections 532.

In the fifth embodiment, the second section 512 pivots on the first section 511. However, as discloses in other embodiments, the first section 511 can be modified to slide corresponding to the second section 512.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An auxiliary mechanism capable of being attached to a portable electronic device for capturing image data from an image medium, the portable electronic device comprising an image capture element, the auxiliary mechanism comprising:
a body;
a fixer, connected to the body, wherein the image medium is placed on the fixer; and
a connecting element, connected to the body and detachably connected to the portable electronic device, wherein the image capture element corresponds to the image medium and capturing the image data therefrom, wherein the body comprises a first section and a second section, the first section is U shaped with a notch, the fixer is disposed on the second section, the second section is moveable between a first position and a second position, the second section fills the notch when the second section is in the first position, and the second section is moved out of the notch when the second section is in the second position.

2. The auxiliary mechanism as claimed in claim 1, wherein the body is a sheet.

3. The auxiliary mechanism as claimed in claim 1, wherein the fixer is a sheet.

4. The auxiliary mechanism as claimed in claim 1, wherein the fixer comprises a slot, and the image medium is inserted into the slot.

5. The auxiliary mechanism as claimed in claim 1, wherein the connecting element is a hook, and the connecting element is attached to the portable electronic device.

6. The auxiliary mechanism as claimed in claim 5, further comprising an elastic element disposed between the connecting element and the body, wherein the elastic element provides an elastic force to the connecting element, and auxiliary mechanism clamps the portable electronic device via the elastic force.

7. The auxiliary mechanism as claimed in claim 1, wherein the connecting element is a magnetic element, and the connecting element connects the portable electronic device by a magnetic force.

8. The auxiliary mechanism as claimed in claim 1, wherein the body comprises a receiving recess, and the connecting element is received in the receiving recess when the auxiliary mechanism is not in use.

9. The auxiliary mechanism as claimed in claim 8, wherein the connection comprises an U-shaped section and a connection section, the U-shaped section is connected to the connection section, the body further comprises a guiding groove, the connection section slides in the guiding groove, the U-shaped section is received in the receiving recess when the auxiliary mechanism is not in use, and the U-shaped section slides out of the receiving recess to be hang on the portable electronic device when the auxiliary mechanism is in use.

10. An auxiliary mechanism capable of being attached to a portable electronic device for capturing image data from an image medium, the portable electronic device comprising an image capture element, the auxiliary mechanism comprising:
  a body;
  a fixer, connected to the body, wherein the image medium is placed on the fixer; and
  a connecting element, connected to the body and detachably connected to the portable electronic device, wherein the image capture element corresponds to the image medium and capturing the image data therefrom,
wherein the body comprises a first section and a second section, the first section comprises a first opening, the second section comprises a second opening, the fixer is disposed on the second section, the second section pivots on the first section around a pivot axis, and the pivot axis is parallel to the body.

11. An auxiliary mechanism capable of being attached to a portable electronic device for capturing image data from an image medium, the portable electronic device comprising an image capture element, the auxiliary mechanism comprising:
  a body;
  a fixer, connected to the body, wherein the image medium is placed on the fixer; and
  a connecting element, connected to the body and detachably connected to the portable electronic device, wherein the image capture element corresponds to the image medium and capturing the image data therefrom,
wherein the body comprises a first section and a second section, the first section comprises an opening, the fixer is disposed on the second section, the second section pivots on the first section around a pivot axis, and the pivot axis is parallel to the body.

12. The auxiliary mechanism as claimed in claim 11, wherein when the image capture element captures the image data of the image medium through the opening, the first section is perpendicular to the second section.

* * * * *

UNITED STATES PATENT AND TRADEMARK OFFICE
CERTIFICATE OF CORRECTION

PATENT NO.        : 8,416,560 B2
APPLICATION NO.   : 13/117091
DATED             : April 9, 2013
INVENTOR(S)       : Kuo-Kun Lin et al.

Page 1 of 1

It is certified that error appears in the above-identified patent and that said Letters Patent is hereby corrected as shown below:

On the title page, item (30), the foreign application priority data should read:

Nov. 29, 2006  (TW) ..... 95221044 U
Jan. 26, 2007  (TW) ..... 96201589 U
Jul. 30, 2007  (TW) ..... 96212438 U

Signed and Sealed this
Twenty-first Day of May, 2013

Teresa Stanek Rea
*Acting Director of the United States Patent and Trademark Office*